(12) United States Patent
Takeuchi et al.

(10) Patent No.: US 8,425,238 B2
(45) Date of Patent: Apr. 23, 2013

(54) ELECTRIC JUNCTION BOX

(75) Inventors: Kunihiko Takeuchi, Kakegawa (JP); Takeshi Onoda, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/176,984

(22) Filed: Jul. 6, 2011

(65) Prior Publication Data
US 2012/0009805 A1  Jan. 12, 2012

(30) Foreign Application Priority Data
Jul. 6, 2010 (JP) ................................ 2010-153657

(51) Int. Cl.
*H01R 12/00* (2006.01)

(52) U.S. Cl.
USPC .......................................................... 439/76.2

(58) Field of Classification Search ................. 439/76.2, 439/79
See application file for complete search history.

(56) References Cited

U.S. PATENT DOCUMENTS

| | | | | |
|---|---|---|---|---|
| 3,423,518 | A * | 1/1969 | Weagant .................... | 174/153 G |
| 3,515,798 | A * | 6/1970 | Sievert ......................... | 174/135 |
| 4,076,360 | A * | 2/1978 | Singh ........................... | 439/147 |
| 4,702,710 | A * | 10/1987 | Dittman et al. ............... | 439/271 |
| 5,226,837 | A * | 7/1993 | Cinibulk et al. ............. | 439/521 |
| 5,490,803 | A * | 2/1996 | McMills et al. .............. | 439/276 |
| 6,048,224 | A * | 4/2000 | Kay .............................. | 439/445 |
| 6,338,644 | B1 * | 1/2002 | Fritzinger et al. ........... | 439/445 |
| 6,338,657 | B1 * | 1/2002 | Harper et al. ................. | 439/692 |
| 6,639,146 | B1 * | 10/2003 | Chiu ............................. | 174/359 |
| 6,679,730 | B2 * | 1/2004 | Dye et al. ...................... | 439/606 |
| 7,044,751 | B2 * | 5/2006 | Takanashi et al. ........... | 439/76.2 |
| 7,137,839 | B2 * | 11/2006 | Dilliner et al. ................ | 439/315 |
| 7,494,348 | B1 * | 2/2009 | Tyler et al. ...................... | 439/79 |
| 7,499,262 | B1 * | 3/2009 | Darr .............................. | 361/626 |
| 7,586,038 | B2 * | 9/2009 | Kanamaru et al. ............. | 174/50 |
| 7,622,674 | B2 * | 11/2009 | Kanamaru et al. ............. | 174/50 |
| 2003/0124884 | A1 * | 7/2003 | Katsumata et al. .......... | 439/76.2 |
| 2004/0115975 | A1 * | 6/2004 | Sato et al. ...................... | 439/98 |
| 2005/0032402 | A1 * | 2/2005 | Takanashi et al. ........... | 439/76.2 |
| 2005/0181644 | A1 * | 8/2005 | Saka et al. .................... | 439/76.2 |
| 2006/0009052 | A1 * | 1/2006 | Hoffmann ..................... | 439/76.2 |
| 2006/0089020 | A1 * | 4/2006 | Kanamaru ..................... | 439/76.2 |
| 2006/0089021 | A1 * | 4/2006 | Kanamaru ..................... | 439/76.2 |
| 2008/0293269 | A1 * | 11/2008 | Kurizono et al. ............. | 439/76.2 |
| 2010/0136805 | A1 * | 6/2010 | Maebashi ..................... | 439/76.2 |

FOREIGN PATENT DOCUMENTS

JP  4-93423 U  8/1992

* cited by examiner

*Primary Examiner* — Amy Cohen Johnson
*Assistant Examiner* — Vladimir Imas
(74) *Attorney, Agent, or Firm* — Edwards Wildman Palmer LLP; James E. Armstrong, IV; Stephen D. LeBarron

(57) ABSTRACT

The present invention is to provide an electric junction box having an enhanced watertight performance by easily winding a fixing member from a guide portion to a plurality of electric wires. The electric junction box includes a box main body and a tubular guide portion projecting from the box main body and guiding the electric wires to an outside of the box main body. A fixing member is continuously wound from the guide portion to the electric wires after the electric wires are passed through the inside of the guide portion. The guide portion includes a rib projected outward from the guide portion for preventing displacement of the fixing member. The rib is separated from the end portion of the guide portion away from the box main body.

9 Claims, 6 Drawing Sheets

ELECTRIC JUNCTION BOX

The priority application Number Japan Patent Application No. 2010-153657 upon which this patent application is based is hereby incorporated by reference.

BACKGROUND OF THE INVENTION

1. Filed of the Invention

The prevent invention relates to an electric junction box installed in an engine room of a vehicle.

2. Description of the Related Art

Various electronic devices are mounted on a vehicle as a moving object. In the vehicle, an electric junction box having an electric component including a connector, a relay, a fuse and the like is arranged in a suitable place between a power source and the electronic device so as to supply electric power with the various electronic devices.

Incidentally, the electric junction box is referred to as a junction block, a fuse block, or a rely box. In this description, these junction block, fuse block and the relay box are collectively called the electric junction box hereafter.

FIG. 6 is a top view showing a conventional electric junction box. FIG. 7 is an enlarged view showing a guide portion included in the conventional electric junction box shown in FIG. 6. FIG. 8 is a sectional view showing a condition that a plurality of electric wires are passed through the guide portion of the conventional electric junction box shown in FIG. 6 and an adhesive tape is wound around the conventional guide portion. The conventional electric junction box 101 shown in FIG. 6 includes a box main body 102 and a tubular guide portion 106. The box main body 102 is formed in a box shape and received various electric parts (not shown) therein. The guide portion projects from the box main body 102 and guides a plurality of electric wires 7 to an outside of the box main body 102.

As shown in FIGS. 7 and 8, after the plurality of electric wires 7 are passed through an inside of the guide portion 106, an adhesive tape 8 as a fixing member is continuously wound around an outer periphery of the guide portion 106 and the electric wires 7 from the guide portion 106 to the electric wires 7 without any gap.

Further, the guide portion 106 includes a rib 166 projecting toward an outside direction of the guide portion 106. The rib 166 is arranged in an end 106a located away from the box main body 102 (for example, see Patent Document 1).

[Patent Document 1] JP, A, H04-93423

However, in the conventional electric junction box 101, there is a problem describe below. That is, because the rib 166 is included in the conventional electric junction box 101 and arranged in the end 106a away from the box main body 102, a step (difference in height) between the rib 166 and the electric wire 7 becomes big as compared with the rib 166 not arranged in the end 106a. Thereby, it is difficult to continuously wind the adhesive tape 8 as the fixing member around the outer periphery of the guide portion 106 and the electric wires 7 from the guide portion 106 to the electric wires 7 without any gap. In addition, by a gap generated between the adhesive tape 8 and the electric wires 7, watertight performance may decrease and the adhesive tape 8 comes off from them. In the worst case, the adhesive tape 8 as the fixing member may be torn.

SUMMARY OF THE INVENTION

Objects to be Solved

Accordingly, an object of the present invention is an electric junction box having an enhanced watertight performance by easily winding a fixing member from a guide portion to a plurality of electric wires.

According to the present invention, an electric junction box includes a box main body, a tubular guide portion projecting from the box main body and guiding a plurality of electric wires to an outside of the box main body, and a fixing member continuously wound from the guide portion to the electric wires after the electric wires are passed through an inside of the guide portion. The guide portion includes a rib projected outward from the guide portion for preventing displacement of the fixing member, and the rib is arranged at a position away from an end portion of the guide portion away from the box main body. Thereby, a step (difference in height) between the guide portion and the electric wires can be reduced than when the rib is arranged in the tip portion of the guide portion away from the box main body. Therefore, the fixing member such as an adhesive tape can be easily wound from the guide portion to the electric wires continuously without any gap, and the electric junction box can have more enhanced watertight performance.

The above and other objects and features of this invention will become more apparent from the following description taken in conjunction with the accompanying drawings.

DESCRIPTION OF THE PREFERRED EMBODIMENT

Figure 1:
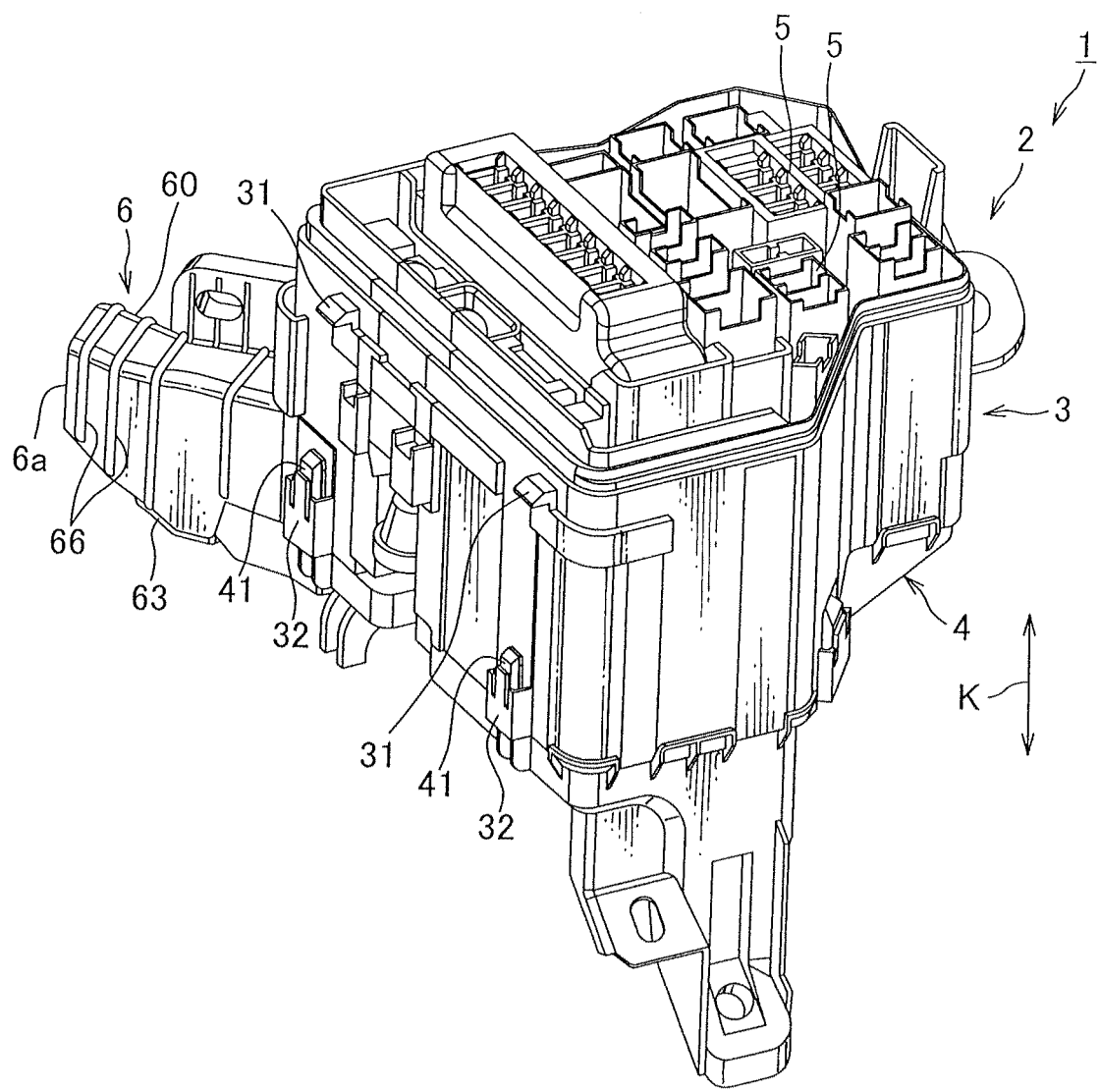
FIG. 1 is a perspective view showing an electric junction box of an embodiment of the present invention.

Hereinafter, an electric junction box 1 according to an embodiment of the present invention will be explained with reference to FIGS. 1 to 5. The electric junction box 1 shown in such as FIG. 1 is attached to an engine room of a vehicle for supplying electric power to various electronic parts mounted on the vehicle. Incidentally, in this description, junction block, fuse block, and relay box are collectively called as the electric junction box 1.

Figure 2:
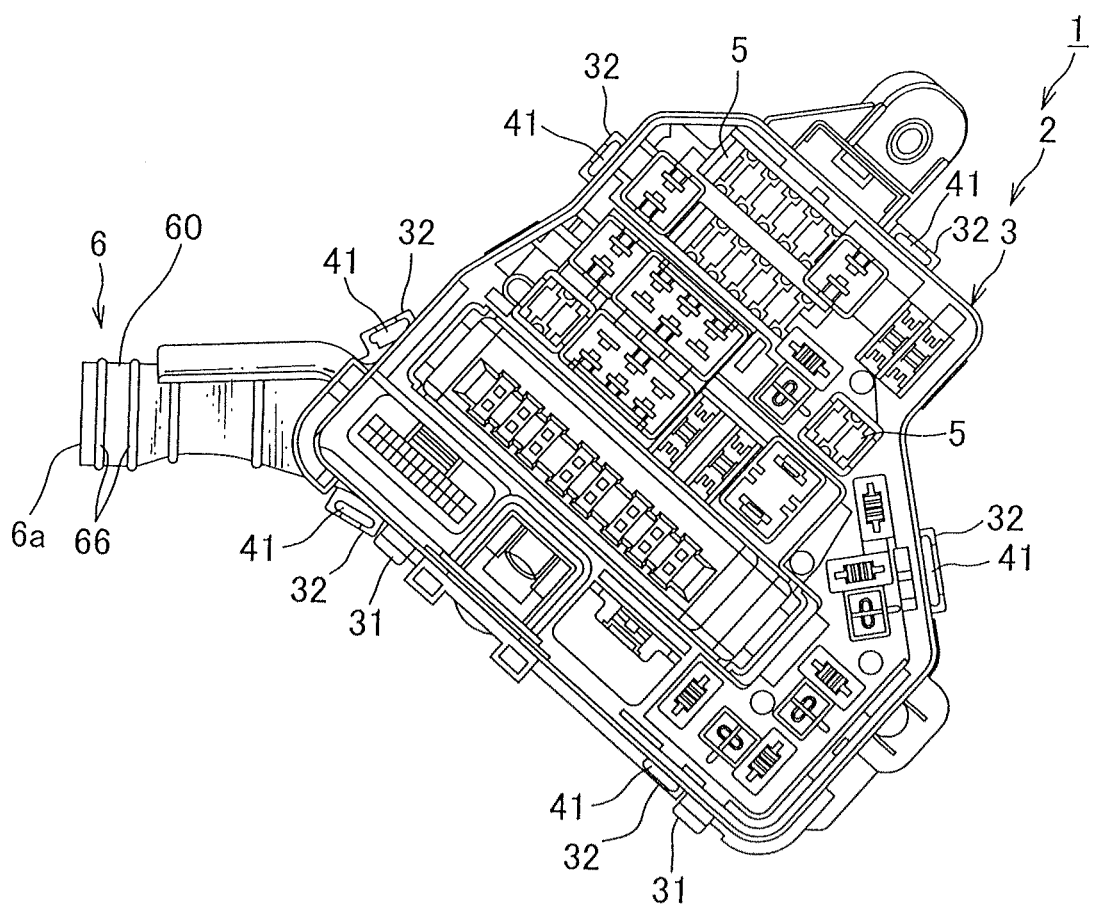
FIG. 2 is a top view of the electric junction box shown in FIG. 1.

As shown in FIGS. 1 and 2, the electric junction box 1 includes a box main body 2 for receiving a plurality of electric parts, a tubular guide portion 6 projecting from the box main body 2 and guiding a plurality of electric wires 7 to an outside of the box main body 2, and a rib 66 provided on the guide portion 6 and projected outward from the guide portion 6. Further, while the plurality of electric wires 7 is passed through an inside of the guide portion 6, an adhesive tape 8 as a fixing member is continuously wound around an outer periphery of the guide portion 6 and the electric wires 7 from the guide portion 6 to the electric wires 7 without any gap.

The box main body 2 includes a tubular main body portion 3, an upper cover (not shown) detachably attached to the main body portion 3 for covering an upper side of the main body portion 3, and a lower cover 4 detachably attached to the main body portion 3 for covering a lower side of the main body portion 3. Furthermore, a plurality of electric parts is mounted on a synthetic-resin-made cassette block 5 and received in the box main body 2. Incidentally, in FIG. 1, the upper cover is removed. Furthermore, an arrow K shown in FIG. 1 indicates a direction that the cover 4 is moved close to or away from the main body portion 3.

The main body portion 3 is made of synthetic resin, and formed by well-known injection molding. The main body portion 3 is provided with an upper-side lock-receiving portion 31 for locking with a later-described locking portion of the upper cover, and a lower-side lock-receiving portion 32 for locking with a later-described locking portion 41 of the lower cover 4.

The upper cover is made of synthetic resin, and formed in a tubular shape having a bottom plate by well-known injection molding. The upper cover is provided with a plurality of locking portions (not shown).

The lower cover 4 is made of synthetic resin, and formed in a tubular shape having a bottom plate by well-known injection molding. The lower cover 3 is provided with a plurality of locking portions 41.

While one ends of the electric wires 7 are connected to the electric parts, the other ends of the electric wires 7 are passed through the guide portion 6, thereby the other ends of the electric wire 7 are guided to an outside of the box main body 2. Further, an inside of the box main body 2 is communicated with an outside of the box main body 2 through the guide portion 6. Also, as shown in FIGS. 4 and 5, an adhesive tape 8 is continuously wound around an outer periphery of later-described wound portions 61B, 62B, a plate portion 65 and the electric wires 7 without any gap.

Figure 3:
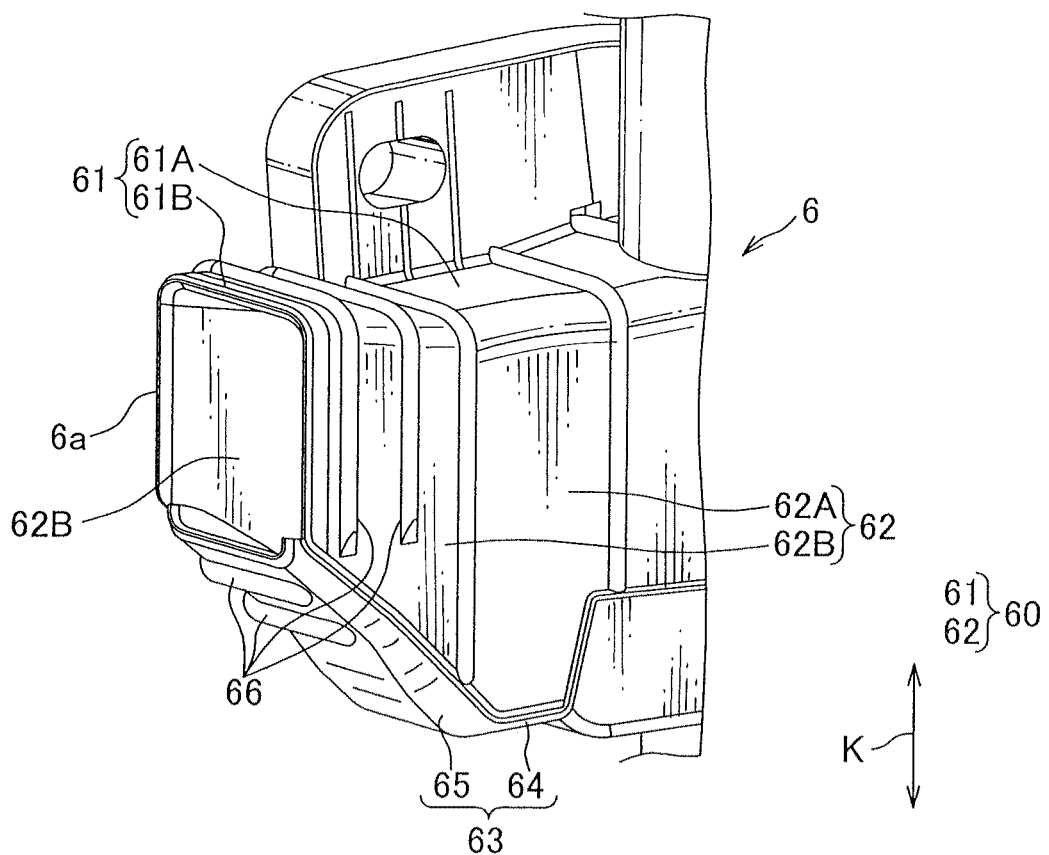
FIG. 3 is an enlarged view showing a guide portion included in the electric junction box shown in FIG. 1.
Figure 4:
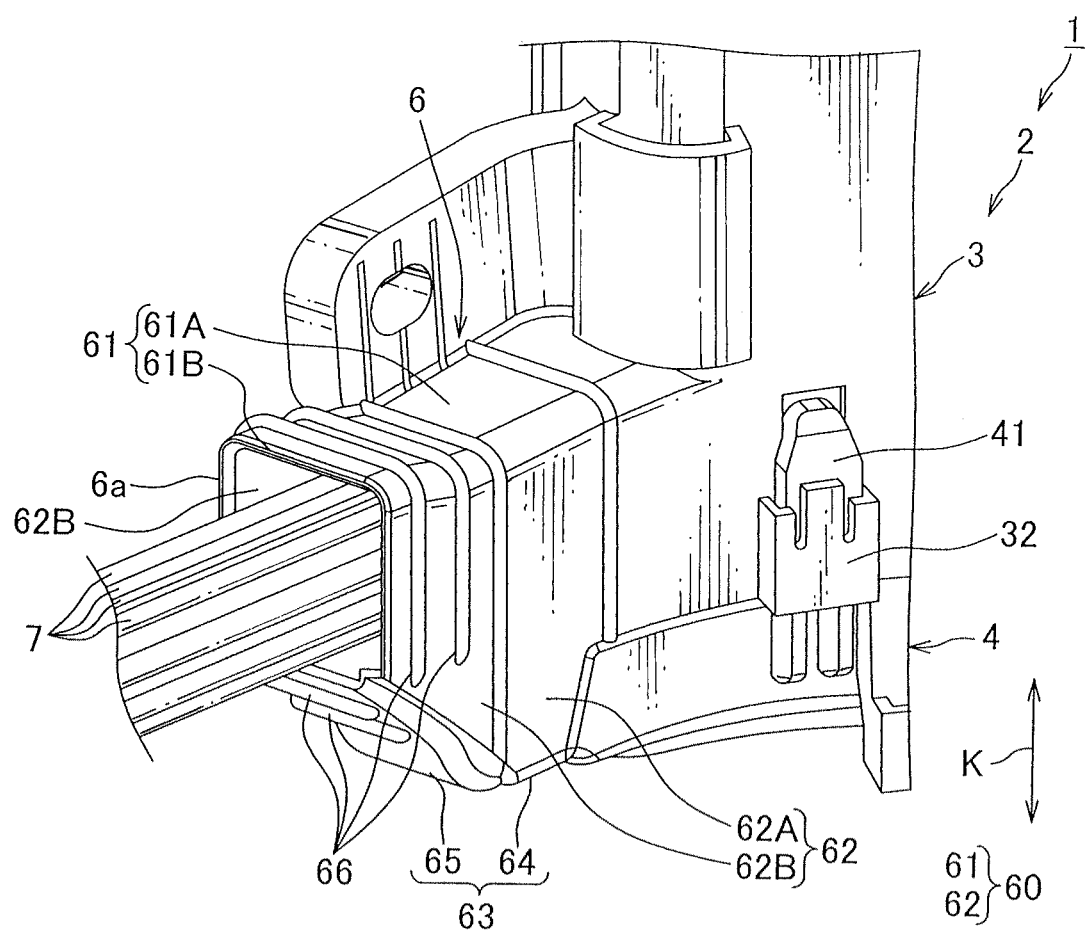
FIG. 4 is a perspective view showing a condition that a plurality of electric wires are passed into the guide portion included in the electric junction box shown in FIG. 1.
Figure 5:
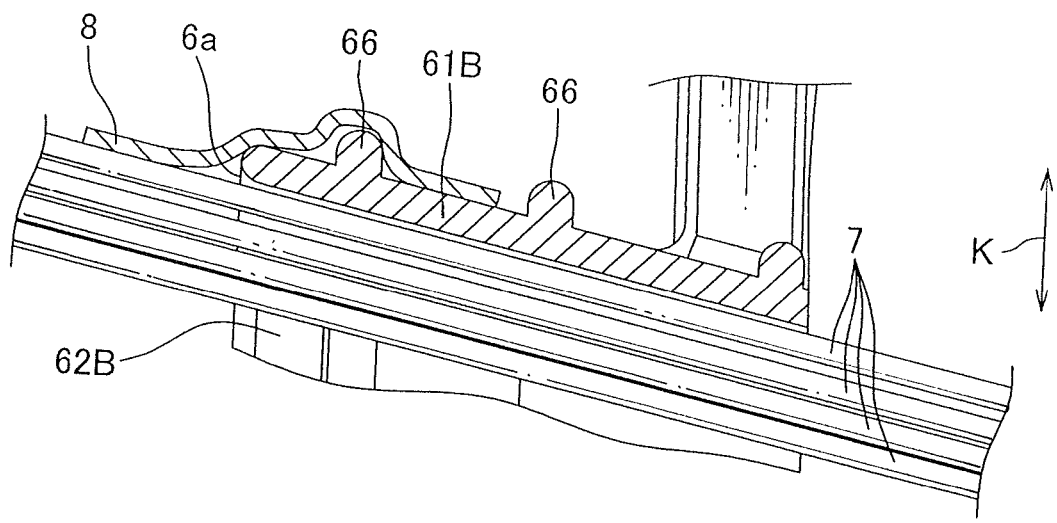
FIG. 5 is a sectional view showing a condition that the electric wires are passed into the guide portion included in the electric junction box shown in FIG. 1 and an adhesive tape is wound therein.
Figure 6:
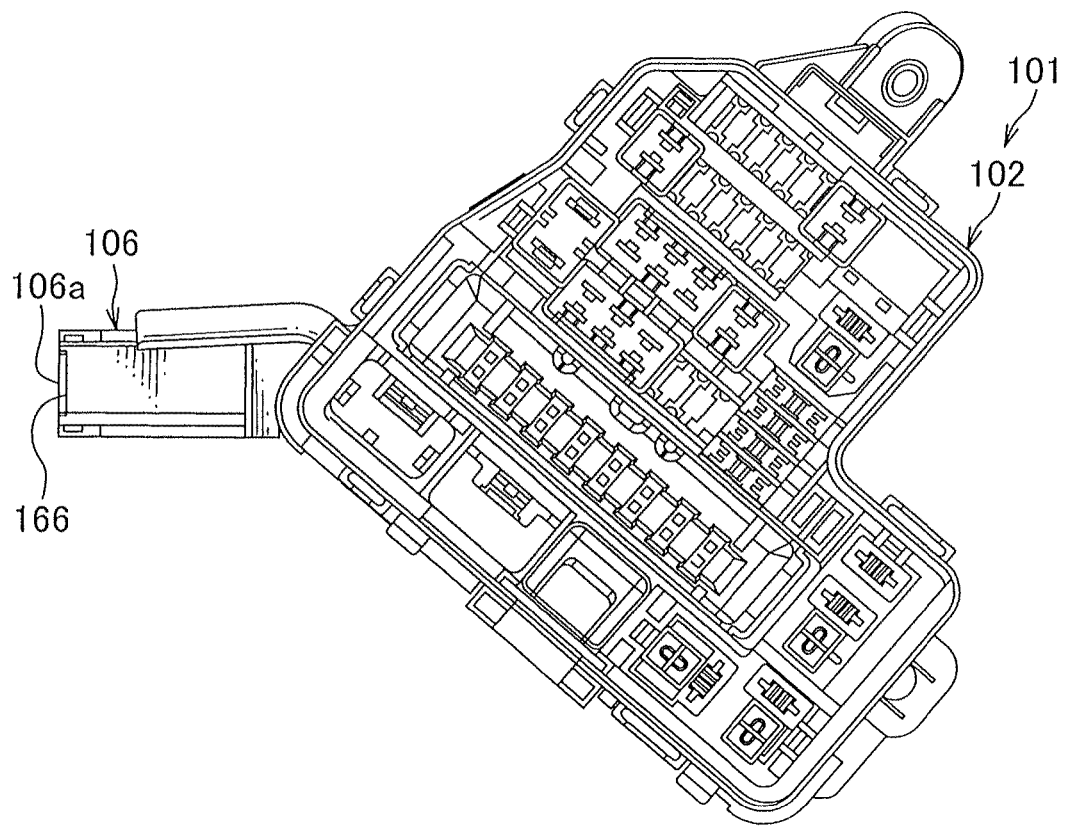
FIG. 6 is a top view showing a conventional electric junction box.
Figure 7:
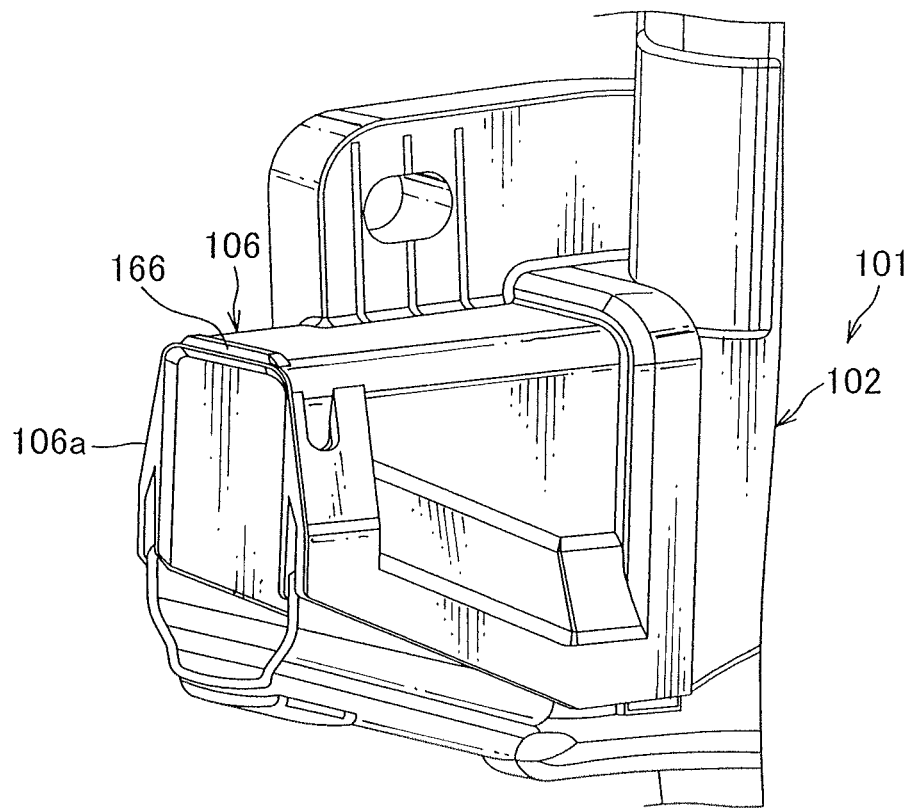
FIG. 7 is an enlarged view showing a guide portion included in the conventional electric junction box shown in FIG. 6.
Figure 8:
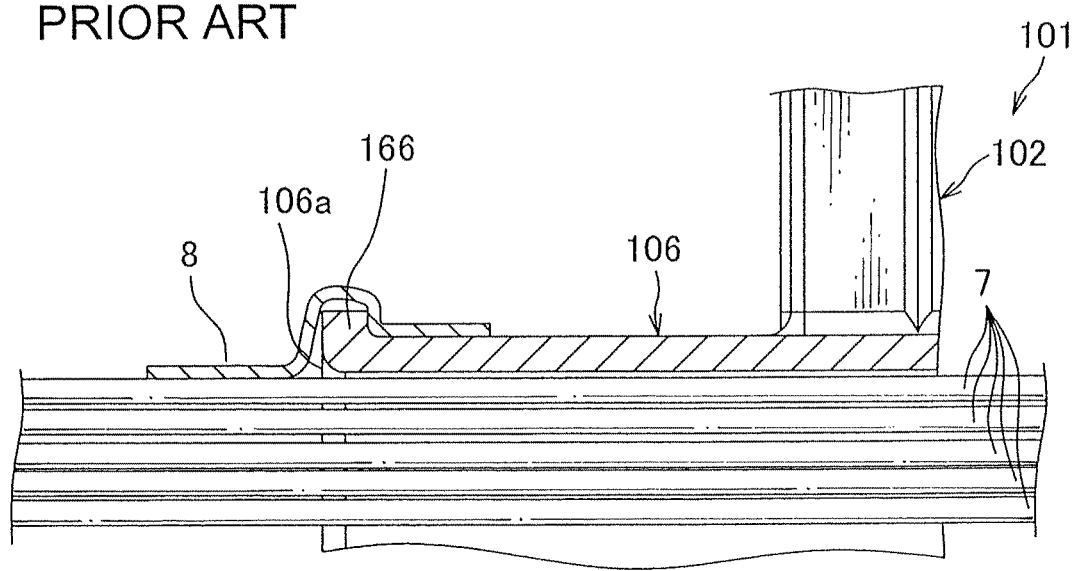
FIG. 8 is a sectional view showing a condition that a plurality of electric wires are passed through the guide portion of the conventional electric junction box shown in FIG. 6 and an adhesive tape is wound around the conventional guide portion.

As shown in FIGS. 3 and 4, the guide portion 6 includes a gutter-shaped portion 60 extended from an edge of a bottom side of the main body portion 3, and a bottom wall portion 63 extended from an edge of the lower cover 4 which is overlapped with the edge of the bottom side of the main body portion 3. When the lower cover 4 is attached to the main body portion 3, edges of the gutter-shaped portion 60 and the bottom wall portion 63 in a circumferential direction are overlapped with each other to compose the rectangular-tubular-shaped guide portion 6.

The gutter-shaped portion 60 includes a plate-shaped ceiling wall portion 61, and a pair of plate-shaped side wall portions 62 extended from both edges of the ceiling wall portion 61 in a circumferential direction.

The ceiling wall portion 61 is provided at the upper cover side in the arrow K direction. Further, the ceiling wall portion 61 includes a base portion 61A continued to the main body portion 3, and a first wound portion 61B continued to a side of the base portion 61A away from the box main body 2. As shown in FIG. 4, the first wound portion 61B is inclined in the arrow K direction approaching the upper cover (a direction separating from the lower cover 4) as the first wound portion 61B extends from a base end of the first wound portion 61*b* near the box main body 2 to a tip portion 6*a* of the first wound portion 61B away from the box main body 2.

The pair of side wall portions 62 respectively includes a base portion 62A continued to the base portion 61A, and a second wound portion 62B continued to both the base portion 62A and the first wound portion 61B. Further, as shown in FIG. 3, an edge of the second wound portion 62B away from the ceiling wall portion 61 is inclined in the arrow K direction approaching the ceiling wall portion 61 as the edges extended from the base end of second wound portion 62B to the tip portion 6*a*. Thus, the guide portion 6 is gradually tapered toward the tip portion 6*a* of the guide portion 6 and formed.

The bottom wall portion includes a flexible portion 64 and a plate portion 65. The flexible portion 64 is continued to the lower cover 4 and faces the base portion 61A. The plate portion 65 is continued to the flexible portion 64 and faces the first wound portion 61B.

A thickness of the flexible portion 64 is thinner than that of the plate portion 65. The flexible portion 64 is elastically deformable along the arrow K direction. Namely, the flexible portion 64 is elastically deformable both inward and outward of the guide portion 6. Further, when the flexible portion 64 is not deformed (namely, in a neutral state), an inner radius of the guide portion 6 is so formed to fit in a minimum case of a radius of the electric wires 7, and the edges of the plate portion 65 and the second wound portion 62B are overlapped with each other. Furthermore, when the flexible portion 64 is deformed outward of the guide portion 6 (arrow K direction), the edges of the plate portion 65 and the second wound portion 62B are not overlapped with each other, and the plate portion 65 is pushed in a direction (arrow K direction) increasing the radius of the guide portion 6 by the electric wires 7.

As shown in FIGS. 4 and 5, the ribs 66 are provided on a whole circumference of the wound portions 61B, 62B and plate portion 65. A plurality of ribs 6 are arranged from a position near the tip portion 6*a* of the guide portion 6 toward the box main body 2 with a gap. That is, the rib 66 is not provided on the tip portion 6*a* of the guide portion 6. Further, the adhesive tape 8 is wound around the outer periphery of the ribs 66, and the ribs 66 prevent the adhesive tape 8 from being dislocated.

An assembling procedure of the electric junction box 1 will be explained. First, electric parts connected to ends of the electric wires 7 are mounted on the cassette block 5, and the cassette block 5 is received in the main body portion 3. Alternatively, after the cassette block 5 having the electric parts 5 is received in the main body portion 3, ends of the electric wires 7 may be connected to the electric parts. Then, the other ends of the electric wires 7 which are connected to each electric part are guided to an outside of the main body portion 3. Next, when the other ends of the electric wires 7 are guided to the outside of the main body portion 3, the lower cover 4 is moved close to the main body portion 3 for covering the bottom side of the main body portion 3. Then, edges of the gutter-shaped portion 60 and the bottom wall portion 63 in a circumferential direction are overlapped with each other, and the locking portion 41 of the lower cover 4 is locked with the lock-receiving portion 32 of the main body portion 3. Thereby, the guide portion 6 is assembled. At this time, the electric wires 7, of which one ends are connected to the electric parts, and the other ends are guided to the outside of the main body portion 3 (box main body 2), are passed through an inside of the guide portion 6. Further, when the electric wires 7 are passed through the inside of the guide portion 6, the adhesive tape 8 as the fixing member is continuously wound around an outer periphery of the wound portions 61B, 62B, the plate portion 65 of the bottom wall portion 63 and the electric wires 7 from the wound portions 61B, 62B and the plate portion 65 of the bottom wall portion 63 to the electric wires 7 without any gap. At this time, because the rib 66 is provided on the wound portions 61B, 62B and the plate portion 65 of the bottom wall portion 63, the adhesive tape 8 is wound around the outer periphery of the rib 66. Finally, the locking portion of the upper cover is locked with the lock-receiving portion 31 of the main body portion 3. Thereby the box main body 2 is assembled, and at the same time, the electric junction box 1 is assembled.

According to this embodiment, the ribs 66 which are projected outward from the guide portion 6 and prevent the adhesive tape 8 from being dislocated are provided on the guide portion 6. Further, the ribs 66 are arranged from a position near the tip portion 6a of the guide portion 6 toward the box main body 2 with a gap, and are not arranged on the tip portion 6a. Thereby, a step between the guide portion 6 and the electric wires 7 can be smaller than when the ribs 66 are arranged on the tip portion 6a of the guide portion 6. Therefore, by making the step smaller, the adhesive tape 8 can be easily wound from the guide portion 6 to the electric wires 7 continuously without any gap, and the electric junction box 1 can have more enhanced watertight performance.

According to this embodiment, the ribs 66 are arranged from a position near the tip portion 6a of the guide portion 6 toward the box main body 2 with a gap around the whole circumference of the guide portion 6. However, the present invention is not limited to this. The rib 66 may be partially provided on the guide portion 6 as long as the ribs 66 are separated from the tip portion 6a and arranged on the guide portion 6.

Further, according to this embodiment, the guide portion 6 includes the gutter-shaped portion 60 and the bottom wall portion 63 extended from the lower cover 4. That is, the guide portion 6 is integrally included with the box main body 2. However, the present invention is not limited to this. For example, the guide portion 6 may be a member arranged on a side cover assembled in the box main body 2 and made separately from the box main body 2.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electric junction box comprising:
    a box main body;
    a tubular guide portion projecting from the box main body and guiding a plurality of electric wires to an outside of the box main body; and
    a fixing member continuously wound from the guide portion to the electric wires after the electric wires are passed through an inside of the guide portion,
    wherein the guide portion includes at least one rib projected outward from the guide portion for preventing displacement of the fixing member, and
    wherein the at least one rib is arranged at a position away from an end portion of the guide portion away from the box main body, and not arranged in a tip of the guide portion and protrudes farther from a surface of the guide portion than the tip.

2. The electric junction box of claim 1, wherein the at least one rib is formed in a direction crossing against a guiding direction of the electric wires.

3. The electric junction box of claim 1, wherein a plurality of the ribs are arranged.

4. The electric junction box of claim 1, wherein the guide portion has four sides.

5. The electric junction box of claim 1, wherein the guide portion has four sides, and the at least one rib on the guide portion exists on at least two corners between two of the sides.

6. The electric junction box of claim 1, wherein the guide portion has four sides, and the at least one rib on the guide portion exists on all four sides.

7. The electric junction box of claim 1, wherein the guide portion is formed in a shape tapered toward a tip portion thereof.

8. The electric junction box of claim 1, wherein the guide portion is separated up and down.

9. The electric junction box of claim 1, wherein the guide portion includes a flexible portion.

* * * * *